(12) United States Patent
Sukumar et al.

(10) Patent No.: US 8,843,533 B1
(45) Date of Patent: Sep. 23, 2014

(54) FILE SYSTEM CONSISTENCY CHECK SYSTEM

(75) Inventors: Vignesh Sukumar, Sunnyvale, CA (US); Andy Kahn, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 818 days.

(21) Appl. No.: 12/269,826

(22) Filed: Nov. 12, 2008

(51) Int. Cl.
*G06F 17/30* (2006.01)

(52) U.S. Cl.
USPC .......................................... 707/822

(58) Field of Classification Search
CPC ............................... G06F 17/30067
USPC .............. 707/690, 821–831, 999.2
See application file for complete search history.

(56) References Cited

U.S. PATENT DOCUMENTS

| | | | |
|---|---|---|---|
| 7,546,319 B1* | 6/2009 | Srinivasan et al. | 1/1 |
| 7,653,699 B1* | 1/2010 | Colgrove et al. | 709/213 |
| 8,316,066 B1* | 11/2012 | Srinivasan et al. | 707/828 |
| 2004/0220932 A1* | 11/2004 | Seeger et al. | 707/8 |
| 2005/0097141 A1* | 5/2005 | Loafman et al. | 707/200 |
| 2007/0005560 A1* | 1/2007 | Dodge | 707/1 |
| 2008/0222152 A1* | 9/2008 | Godbole | 707/8 |
| 2009/0006494 A1* | 1/2009 | Hong et al. | 707/202 |
| 2010/0115009 A1* | 5/2010 | Callahan et al. | 707/825 |

* cited by examiner

*Primary Examiner* — Alexey Shmatov
*Assistant Examiner* — Grace Park
(74) *Attorney, Agent, or Firm* — DeLizio Gilliam, PLLC (57) ABSTRACT

This disclosure presents checking file system consistency for a storage server. During a start up phase of a file system, a consistency checker, upon receiving a request from an internal client for a part of data managed by a file system of the storage server, checks file system consistency only for a part of metadata. The part of metadata is used to maintain consistency of the requested data. After the consistency check of the part of metadata is completed, the internal client is allowed to access the requested data before a remainder of the metadata is checked for consistency.

13 Claims, 9 Drawing Sheets

FILE SYSTEM CONSISTENCY CHECK SYSTEM

FIELD OF THE INVENTION

The present invention relates to a file system for a storage server, and more specifically to a file system consistency check for a storage server connected to a network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2008, NetApp, Inc., All Rights Reserved.

BACKGROUND OF THE INVENTION

In general, a storage server is any host device capable of performing storage related functions such as file-based requests and/or block-based requests from clients. Thus, storage servers include storage area network (SAN) devices, network attached storage (NAS) devices, direct attached storage (DAS) devices, etc.

Typically, storage servers are coupled within a storage network or storage system controlled by a storage operating system. The storage operating system implements a file system to logically organize the information as a hierarchical structure of directories and files on, e.g., the disks. The disk storage may be implemented as one or more storage "volumes" that comprise a cluster of physical storage devices (disks) defining an overall logical arrangement of disk space. Each volume is generally associated with its own file system.

A file system may adopt an inode buffer tree data structure and supports protocols such as Network File System (NFS) and Common Internet File System (CIFS) for communication with various types of clients. In such a file system, a file consistency checker checks the complete consistency of all the metadata before it allows clients to access data. The file consistency checker loads and checks all the metadata, i.e., all the inode blocks and indirect blocks of a tree. With the advent of aggregates and flexible volumes due to the increased amount of metadata, consistency check may take a long time, causing unavailability of those volumes to clients.

SUMMARY OF THE INVENTION

This invention presents checking file system consistency for a storage server. During a start up phase of a file system consistency checking operation, a consistency checker, upon receiving a request from a client for a part of data managed by a file system of the storage server, checks file system consistency only for a part of metadata. The part of metadata is used to maintain consistency of the requested data. After the consistency check of the part of metadata is completed, the client is allowed to access the requested data before a remainder of the metadata is checked for consistency. Accordingly, clients can access their requested data faster because they do not have to wait until file consistency check is finished for all of the metadata.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
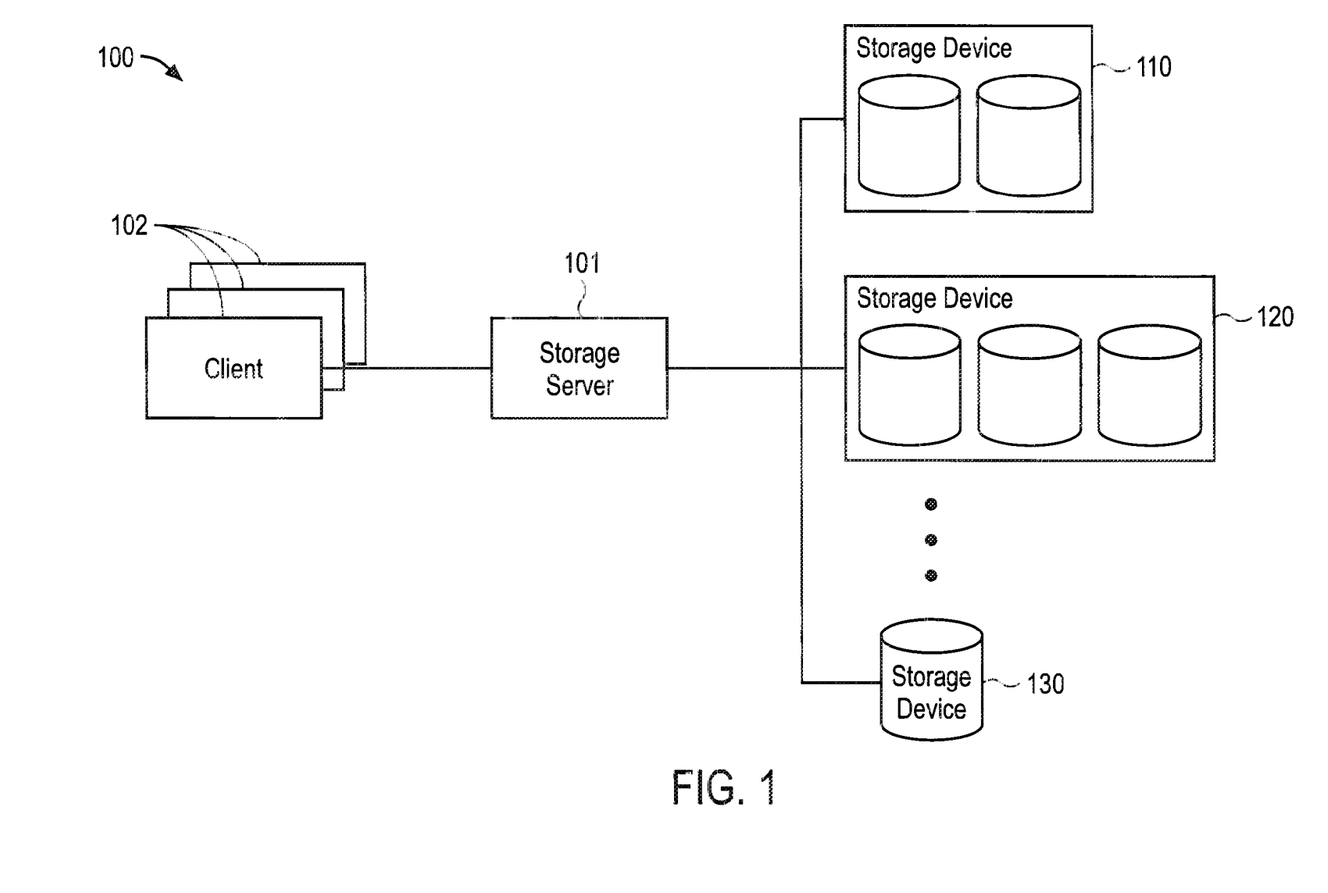
FIG. 1 is a network connection overview of one embodiment of a system for checking file system consistency according to the present invention.

FIG. 1 shows a network connection overview of one embodiment of a system 100 that includes a storage server 101 for checking file system consistency in accordance with the present invention. The storage server 101 is connected to various storage devices 110, 120 and 130 directly or via one or more networks. The networks may include a LAN, WAN, intranet, extranet, wireless network, the Internet, etc. The storage devices 110, 120 and 130 may include memories, tapes, disks, Redundant Arrays of Inexpensive Disks (RAID) and any other optical, electrical or magnetic data recording media.

The storage server 101 is also connected to one or more clients 102 directly or via one or more networks. Various other systems (not shown) can be connected to the networks or the storage server 101 directly or indirectly. The networks may include a LAN, WAN, intranet, extranet, wireless network, the Internet, etc.

The storage server 101 is a computer that provides storage related functions. Thus, storage server 101 may be implemented as a storage area network (SAN) device, a network attached storage (NAS) device, a direct attached storage (DAS) device, or any combination of SAN, NAS and DAS. The storage server 101 can handle file-based requests and/or block-based requests from clients 102 according to a client/server model of information delivery to thereby allow clients 102 to access files stored on the storage devices 110, 120 and 130. The storage server 101, as a computer, is activated by one or more computer programs stored therein. Such computer programs may be stored in a computer readable storage medium, such as, but not limited to, any type of disk including floppy discs, optical discs such as CDs, DVDs and BDs (Blu-Ray Discs), and magnetic-optical discs, read-only memories (ROMs), random access memories (RAMs), EPROMs, EEPROMs, magnetic or optical cards, or any type of media suitable for storing electronic instructions, currently available or to be developed in the future.

The operations of the storage server may be distributed over a computer cluster or the storage server may be part of a computer cluster, which is a group of networked computers. The storage server may include one or more network components (N-blade) and one or more data components (D-blade). The N-blades process requests from network clients based on various network file system protocols (e.g., Common Internet File System (CIFS) or Network File System (NFS)). The D-blades interface one or more groups of disks. The N-blades forward a network request to a D-blade identified by the request.

Figure 2:
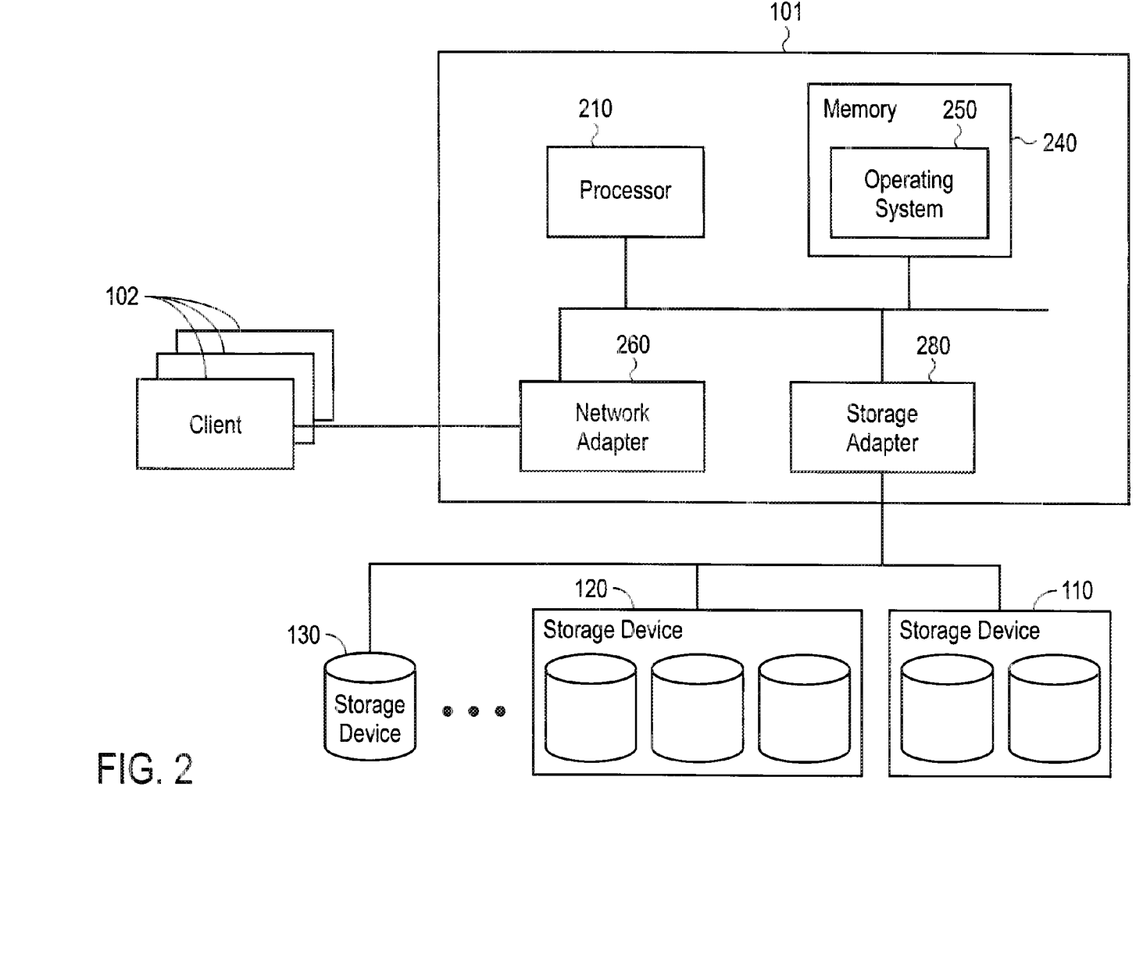
FIG. 2 is a block diagram of one embodiment of a system for checking file system consistency according to the present invention.

FIG. 2 is a block diagram of one embodiment of the storage server 101 for checking file system consistency. The storage server 101 includes a processor 210, a memory 240, a network adaptor 260 and a storage adaptor 280. The storage server 101 also includes an operating system 250 that implements a file system to logically organize the information as a hierarchical structure of files on the storage devices 110, 120 and 130.

In this embodiment, the memory 240 includes storage locations that are addressable by the processor 210 and the adaptors 260 and 280 for storing software program code and data structures associated with the present invention. The processor 210 and the adapters 260 and 280 include, in turn, processing elements and/or logic circuitry configured to execute the software code and manipulate the data structures. The storage operating system 250, portions of which are typically resident in memory and executed by the processing elements, functionally organizes the storage server 101 by, among other things, invoking storage operations in support of a file service implemented by the storage server 101. It will be apparent to those skilled in the art that other processing and memory means, including various computer readable media, may be used for storing and executing program instructions pertaining to the inventive technique described herein.

The network adapter 260 includes the mechanical and signaling circuitry needed to connect the storage server 101 to a client 102 directly or via one or more networks. The client 102 may be a general-purpose computer configured to execute applications. Moreover, the client 102 may interact with the storage server 101 in accordance with a client/server model of information delivery. The client 102 may request the services of the storage server 101, and the storage server 101 may return the results of the services requested by the client 102, by exchanging data packets encapsulated under various protocols, e.g., CIFS, NFS, etc.

The storage adapter 280 cooperates with the storage operating system 250 executing on the storage server 101 to access information requested by the client 102. The information may be stored on the storage devices 110, 120 and 130. The storage adapter 280 includes input/output (I/O) interface circuitry that couples to the storage devices 110, 120 and 130 over an I/O interconnect arrangement, such as a high-performance, Fibre Channel link topology. The information is retrieved by the storage adapter 280 and, if necessary, processed by the processor 210 (or the storage adapter 280 itself) prior to being forwarded to the network adapter 260, where the information is formatted into a packet and returned to the client 102.

The storage devices 110, 120 and 130 can be viewed to the storage server 101 as one or more aggregates of one or more volumes defining an overall logical arrangement of disk space provided by the storage devices 110, 120 and 130. A volume can be comprised of a cluster of various portions of one or more physical disks, which can be distributed over one or more networks. In one embodiment, each volume can be associated with its own file system. To facilitate access to the disks of the storage devices 110, 120 and 130, in one embodiment, the operating system 250 implements a file system. In the file system, each file may be implemented as set of disk blocks configured to store information.

Figure 3A:
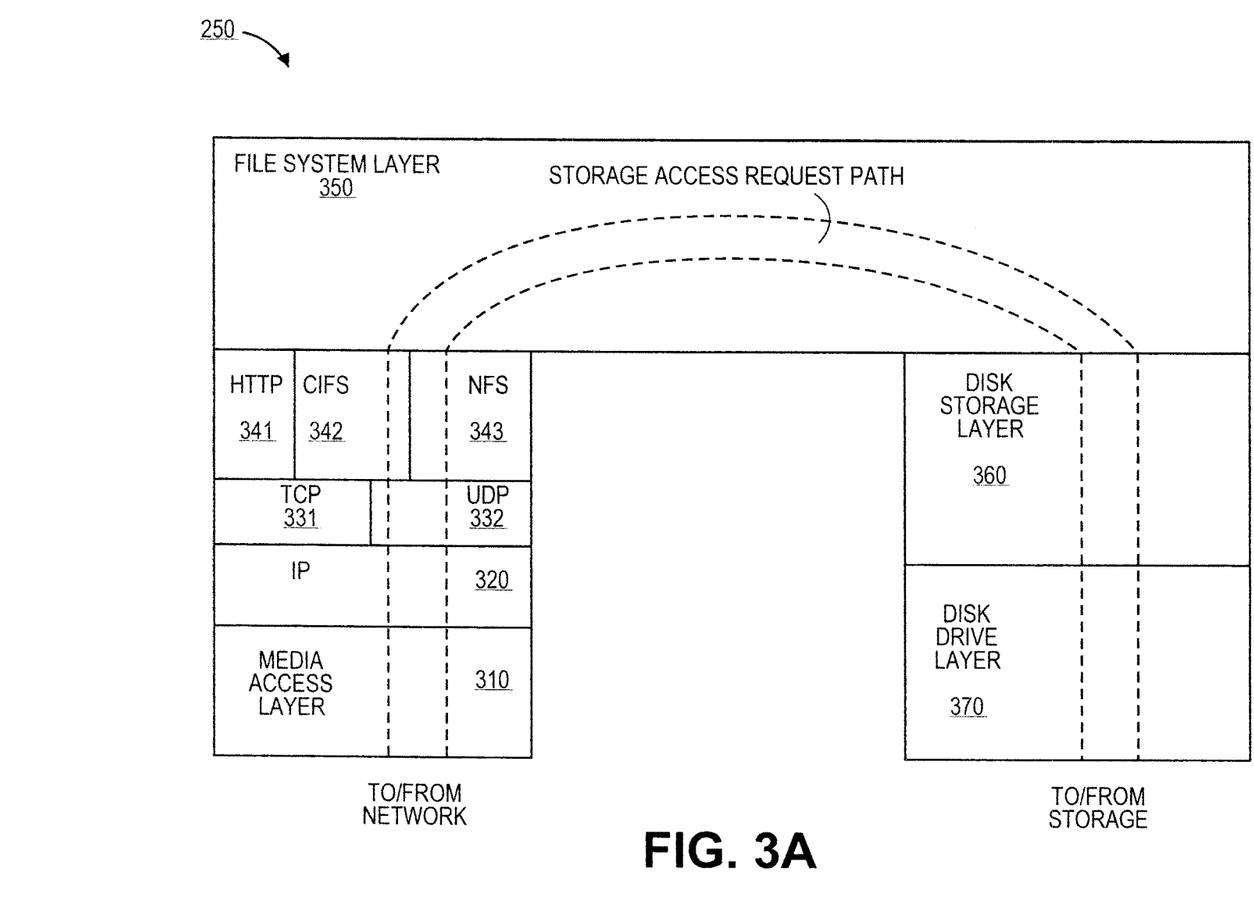
FIGS. 3A-3B describe operations of one embodiment of a system for checking file system consistency according to the present invention.

FIG. 3A is a schematic block diagram of an embodiment of an illustrative operating system 250 shown in FIG. 2. The storage operating system 250 has a series of software layers, including a media access layer 310 of network drivers (e.g., an Ethernet driver). The operating system further includes network protocol layers, such as the Internet Protocol (IP) layer 320 and its supporting transport mechanisms, the Transport Control Protocol (TCP) layer 331 and the User Datagram Protocol (UDP) layer 332. A file system protocol layer provides multi-protocol data access and, to that end, includes support for the CIFS protocol 342, the NFS protocol 343 and the Hypertext Transfer Protocol (HTTP) protocol 341. In addition, the storage operating system 250 includes a disk storage layer 360 that implements a disk storage protocol, such as a Redundant Array of Independent Disks (RAID) protocol, and a disk driver layer 370 that implements a disk access protocol such as, e.g., a Small Computer Systems Interface (SCSI) protocol.

Bridging the disk software layers with the network and file system protocol layers is a file system layer 350 that implements a file system according to the present invention, which will be discussed in more details below.

Operationally, a request from a client is forwarded as, e.g., a CIFS protocol packet onto the storage server. A network driver of the media access layer 310 processes the packet, passes it onto the network protocol layers 320, 332 and CIFS layer 342 for additional processing prior to forwarding to the file system layer 350. The file system layer 350 then passes a logical number to the disk storage (RAID) layer 360, which maps that logical number to a disk block number and sends the latter to an appropriate driver (e.g., SCSI) of the disk driver layer 370. The disk driver accesses the disk block number from disk and loads the requested data block(s) in memory for processing by the storage server. Upon completion of the request, the storage server returns a reply to the client over the network.

It should be noted that the software "path" through the storage operating system layers described above needed to perform data storage access for the client request received at the storage server may be implemented in hardware. In one embodiment, the storage access request data path may be implemented as logic circuitry embodied within a field programmable gate array (FPGA) or an application specific integrated circuit (ASIC). This type of hardware implementation may increase the performance of the file service provided by the storage server in response to a file system request packet issued by client.

Figure 3B:
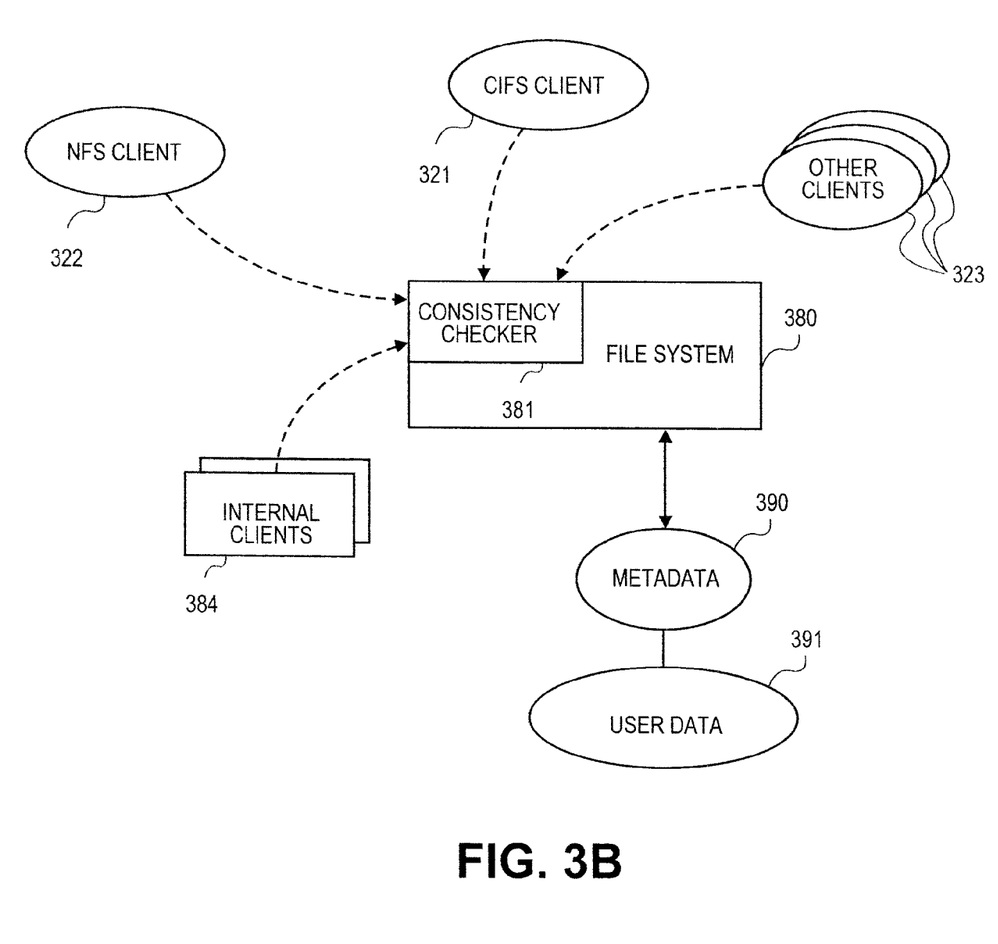

FIG. 3B illustrates operations of one embodiment of the storage server 101 shown in FIG. 2 for checking file system consistency in connection with the file system 380 in accordance with the present invention. The storage operating system has, among other things, a file system protocol layer that implements the file system 380 to be used to access user data 391 or metadata 390. In this embodiment, metadata 390 and user data 391 reside at the storage devices 110, 120 and 130 shown in FIG. 2. Metadata 390 contain information, e.g., data structure, data type, etc. regarding user data 391, making the file system 380 manage data therein and locate data requested from clients.

The file system 380 is equipped with a consistency checker 381 for checking file system consistency of metadata 390 and user data 391. The consistency checker 381 automatically performs file system consistency check at boot time when the storage server detects that the file system is in an inconsistent state, indicating a non-graceful shutdown, such as a crash or power loss. File system consistency check by the consistency checker 381 can also be initiated manually by the system administrator if there is believed to be a problem with the file system.

File system consistency check may operate in a non-interactive or interactive or hybrid mode. In a non-interactive mode, the storage server repairs all the errors it finds in the file system without pausing for user response. In an interactive mode, on the other hand, the storage server examines the file system and stops at each error it finds in the file system and gives the problem description and asks for the administrator's response usually whether to correct the problem or continue without making any change to the file system. In a hybrid mode, the storage server may ask for the administrator's response in a special occasion.

File system consistency check can be performed per volume especially when each volume is associated with its own file system. However, a storage unit for a file system consistency check can vary under the circumstances.

Various external clients 321, 322 and 323 send requests to the file system 380 to read and/or write data from and/or to the disk. In this embodiment, metadata 390 are implemented as files for the file system 380. the file system 380 stores its metadata 390 in files that are written on disk in the storage devices. User data 391 are implemented as data blocks linked with metadata 390. Data structure of metadata 390 and user data 391 will be described in more detail below.

Internal utilities of the storage server 101 can be called internal clients 384. From the point of the file system 380, internal utilities, such as a file system scanner of the storage server, can be viewed and treated as a client, like the external clients 321, 322 and 323. Accordingly, internal clients 384 request the file system 380 to access metadata 390 in a similar way with the external clients 321, 322 and 323.

Any appropriate file system, including a write in-place file system, configured to have metadata of a hierarchical data structure may be used as the file system 380 for implementing the present invention. In particular, a file system with a hierarchical data structure having metadata of a plurality of blocks of levels can be used as the file system 380. As such, the file system should be interpreted broadly to refer to any file system that is otherwise adaptable to the teachings of this invention.

It should be also noted that the file system 380 can significantly reduce the amount of time to be taken for a startup phase when implemented in accordance with the file system consistency checker 381 described herein. A startup phase can be defined as a time period for clients to wait until they are allowed to access data. The file system 380 can make a startup phase shorter because the file system 380 allows clients to access requested data only after checking part of metadata 390 based on clients' requests. More detailed explanation regarding file system consistency check of the file system 380 will be provided below in conjunction with FIGS. 4A-4C.

Figure 4A:
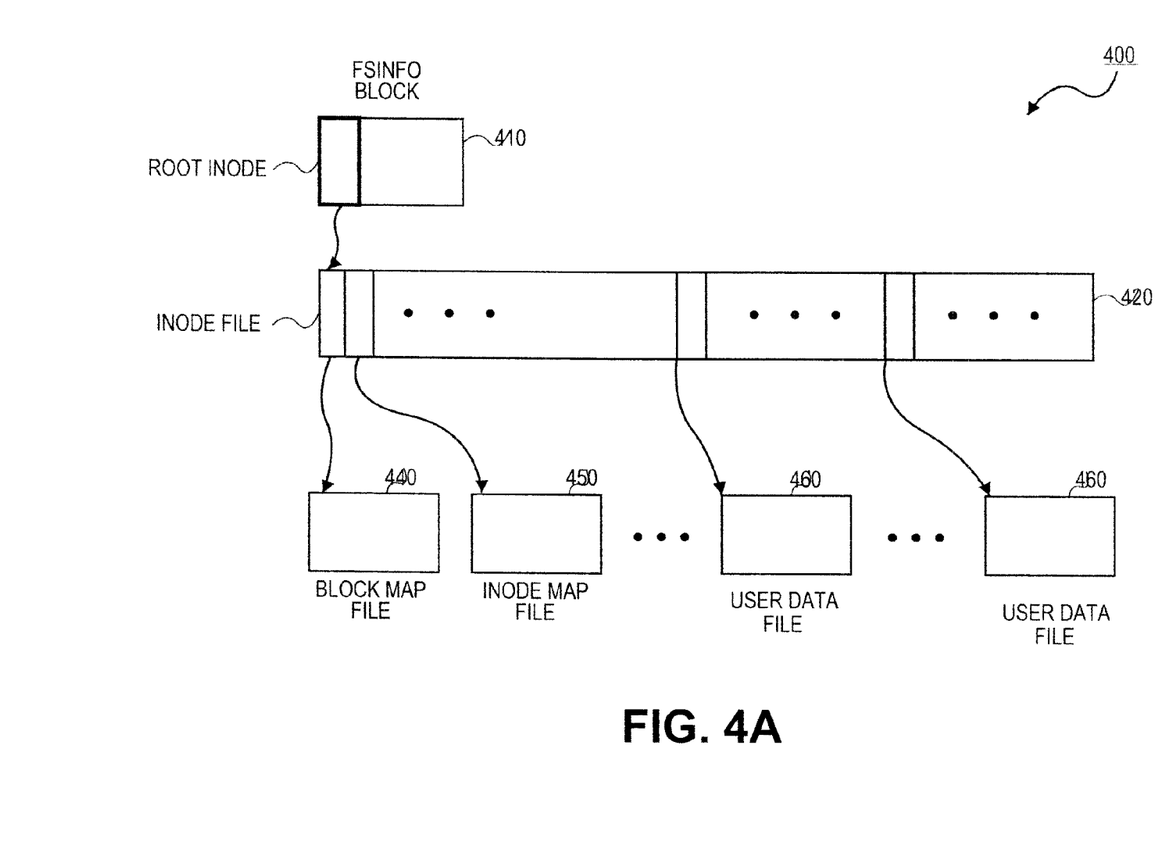
FIGS. 4A-4C illustrate an exemplary data structure of a file system in accordance with one embodiment of the present invention.
Figure 4B:
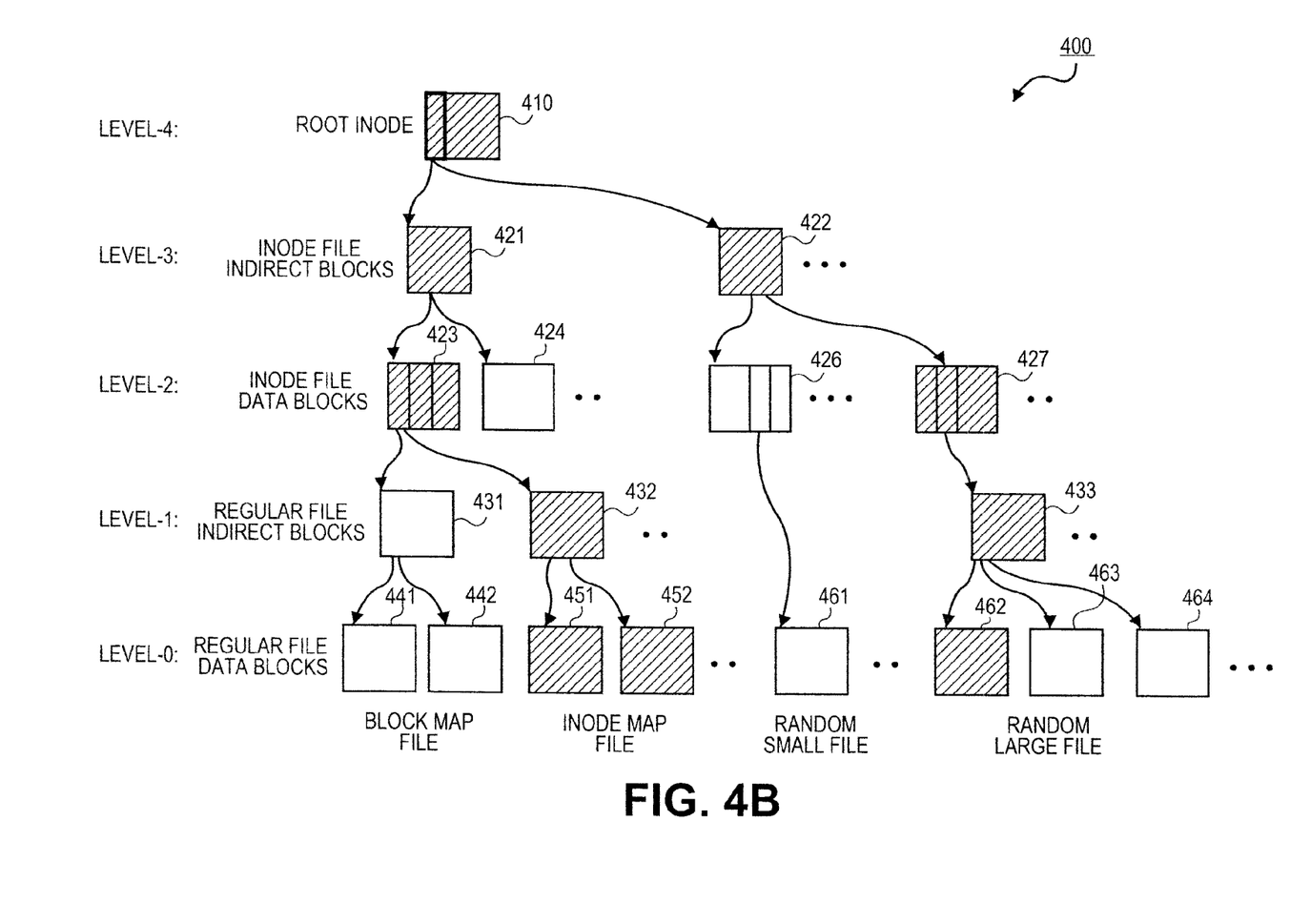
Figure 4C:
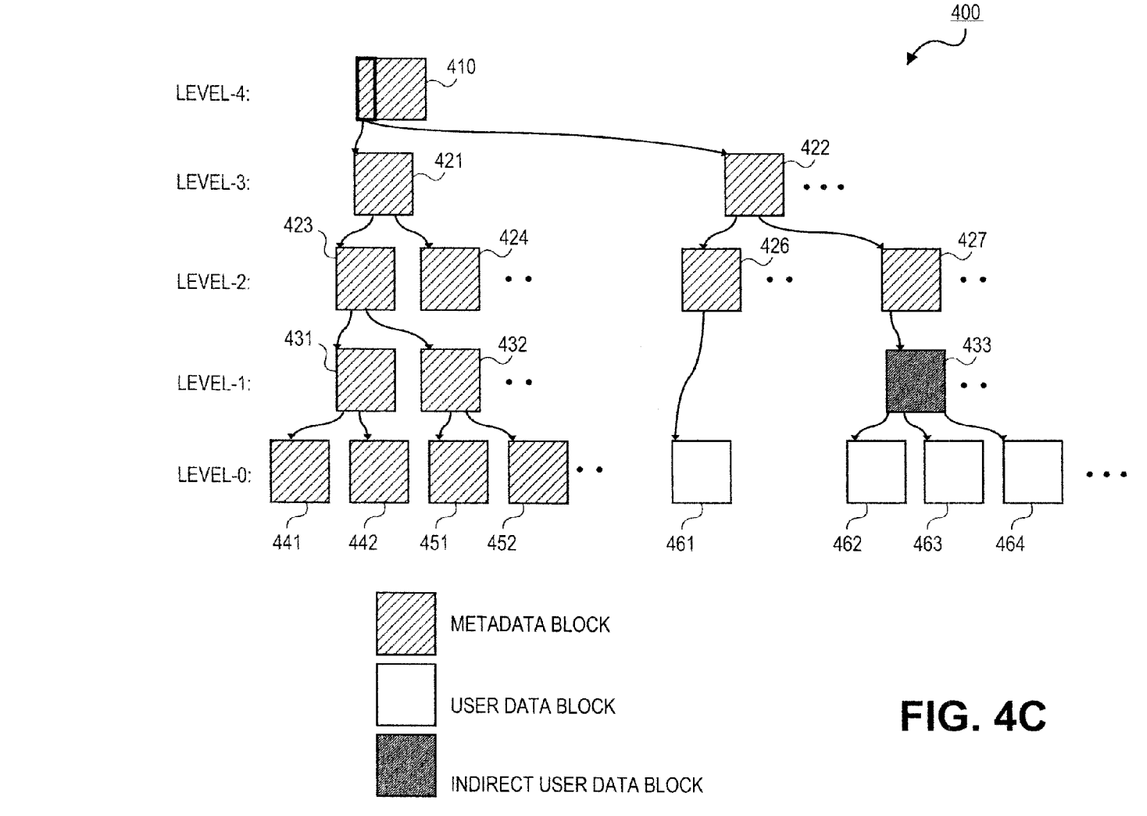

FIGS. 4A-4C illustrate one embodiment of data structure 400 according to the file system 380. The file system 380 stores metadata 390 in files, which describes the layout of the file system. Referring to FIG. 4A, the file system 380 implements a hierarchical structure with a root inode at the top. The root inode can be placed anywhere on a disk and is located during booting of the file system 380. The root inode, referred to as the file system information (FSINFO) block 410, is an inode referencing the inode file 420. The inode file 420 contains inodes that describe the rest of the files in the file system including the block map file 440, inode map file 450 and regular other files, i.e., user data files 460. The inode file 420, block map files 440 and inode map files 450 are metadata files for the file system 380, but the FSINFO block 410 is not a metadata file but is part of the file system 380. The block map file 440 contains an entry for each data block in the aggregates and thereby indicates whether or not a disk block has been allocated. Accordingly, the block map file 440 also serves as a free-block map file. Likewise, the inode map file 450 contains an entry for each block in the aggregates and serves as a free-inode map file. User data files 460 contain user data.

FIG. 4B, a more detailed version of data structure 400 illustrated in FIG. 4A, shows that files under the file system 380 are made up of individual blocks, and that large files have additional layers of indirection between the inode and the actual data blocks. Blocks belonging to the inode file 420, i.e., inode file indirect blocks 421 and 422, and inode file data blocks 423, 424, 426 and 427 are double-layered. Blocks belonging to regular files 460, i.e., regular file indirect blocks 431, 432 and 433, and regular file data blocks 441, 442, 451, 452, 461, 462, 463 and 464 are single or double-layered.

The bottom blocks including blocks 441, 442, 451 and 452 for the block map file 440 and inode map file 450 are called level-0 blocks. The bottom blocks including a block 461 for a random small file and blocks 462, 463 and 464 for a random large file are also called level-0 blocks. Likewise, blocks 431, 432 and 433 immediately above the bottom blocks 441, 442, 451, 452, 461, 462, 463 and 464 are called level-1 blocks. Blocks 423, 424, 426 and 427 are level-2 blocks, and blocks 421 and 422 are level-3 blocks. The FSINFO block 410 containing the root inode is called level-4 block. It should be noted that the number of layers or levels of blocks can vary depending upon pertinent factors such as the size of a block or file.

Referring to FIG. 4C, illustrating the same data structure of FIG. 4B, the hatched blocks 421, 422, 423, 424, 426, 427, 431, 432, 441, 442, 451 and 452 indicate metadata blocks, and the white blocks 461, 462, 463 and 464 indicate user data blocks. The black block 433 indicates an indirect user data block. In this embodiment, a metadata file includes only metadata blocks and do not include indirect user data blocks. In general, only metadata files can be checked at a startup phase, and indirect user data blocks are checked after a startup phase is finished, i.e., during running & completion phases, as discussed below in conjunction with FIGS. 5 and 6.

However, an indirect user data block can be considered "metadata" because metadata 390 can encompass indirect user data blocks. Thus, in another embodiment, the scope of metadata blocks can be defined to include those indirect user data blocks. In this case, indirect user data blocks can be checked as metadata at a startup phase.

One embodiment of a method to be performed by the consistency checker 381 shown in FIG. 3B is described with reference to flow diagrams shown in FIGS. 5 and 6.

Figure 5:
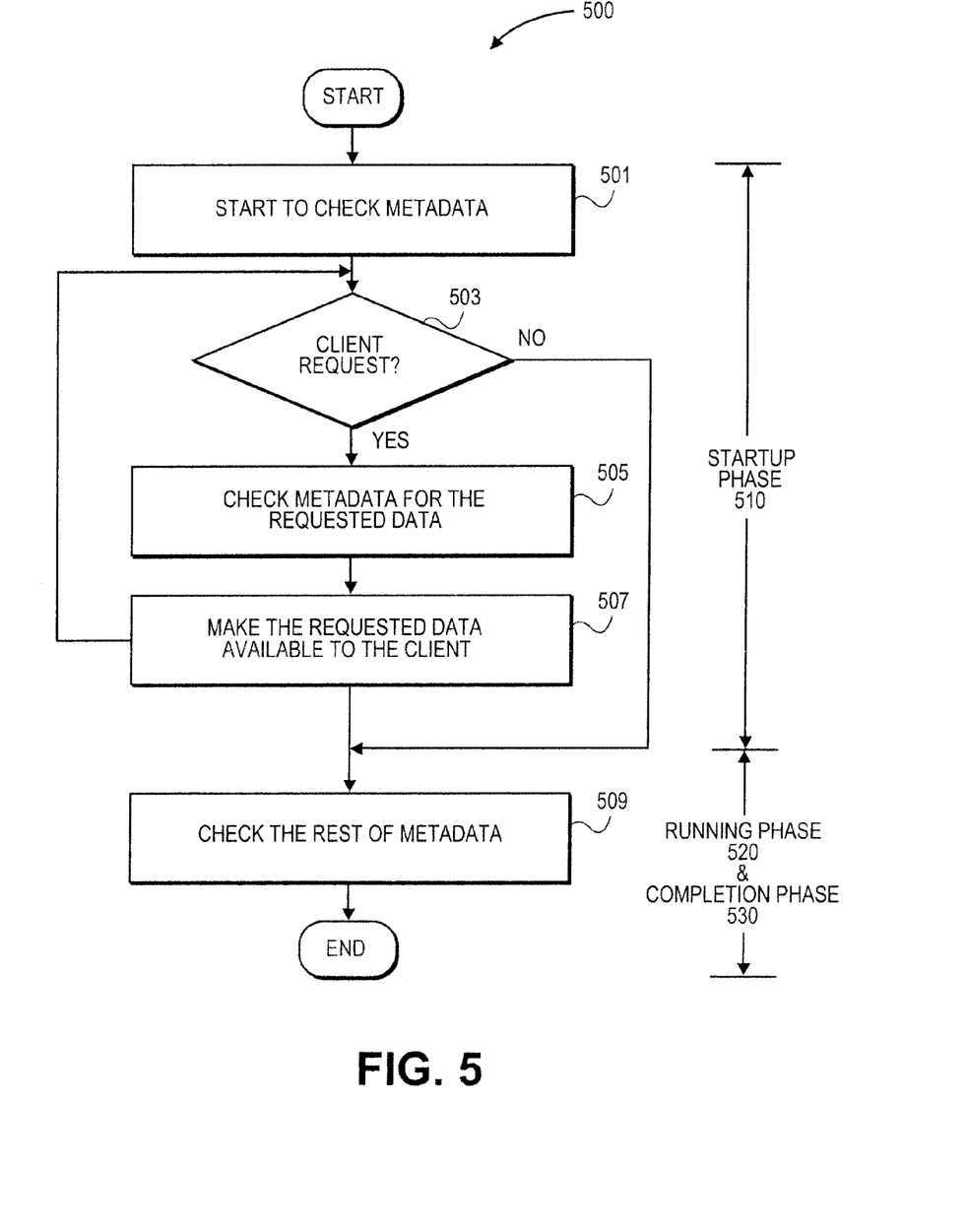
FIG. 5 illustrates a flow diagram of file system consistency check of one embodiment in accordance with the present invention.

Referring first to FIG. 5, the acts to be performed by a computer executing one embodiment of a consistency check method 500 are shown. In this embodiment, file system consistency check is performed with three phases: a startup phase 510, a running phase 520 and a completion phase 530. As discussed above, the consistency checker 381 checks only part of the metadata blocks during the startup phase 510. The rest of the metadata blocks are checked during the running 520 and/or completion phases 530. Indirect blocks pointing to user data blocks are checked during the running phase 520 and/or completion phases 530. If internal conflicts, such as discrepancy between the number stored in the block counts field in inode and the actual number of blocks, are found during the file system consistency check, the consistency checker 381 resolves the conflicts by fixing errors, in the above example, to correct the number stored in the block counts field to be the actual number of blocks, before returning corresponding data to clients.

At block 501, the method 500 starts a file system consistency check on metadata. In the startup phase 510, as discussed above, only a part of metadata as for particular operations for system booting is checked. In this embodiment, internal and external clients may send a request for data to the file system 380. At block 503, client requests are accepted from only internal clients because an external client requests user data, and user data can only be accessed after startup phase 510 ends.

At block 505, in response to the data request from the client, the method 500 checks file system consistency of a part of metadata that corresponds to the requested data. In this embodiment, an internal client can request a part of a file or an entire file or several files. Part of a file requested by an internal client, as well as an entire file and multiple files requested by an internal client, may be contained in one or more level-0 blocks as shown in FIG. 4B.

If an internal client requests a metadata file, for example, inode map blocks 451 and 452 shown in FIG. 4B, the method 500 checks file system consistency of blocks associated with a path that leads to the requested bottom blocks, i.e., level-0 blocks 451 and 452. Referring to FIG. 4B, the blocks associated with the path are the hatched blocks above the requested two blocks 451 and 452, i.e., level-4 block 410, level-3 block 421, level-2 block 423, level-1 block 432 and level-0 blocks 451 and 452. The method 500 checks the blocks along the identified path. For example, the root inode in the top block 410 will be checked, and the level-3 block 421, level-2 block 423, level-1 block 432, level-0 blocks 451 and 452 will be checked. It should be noted that when metadata are requested, blocks "associated with" a path leading to one or more requested blocks include the requested blocks, and thus, the requested metadata blocks are also checked. Meanwhile, other blocks, for example, 424, 431, 441 and 442 which are not directly associated with the path leading to the requested blocks 451 and 452 are not checked at this point. In this embodiment, a path among blocks is created using pointers that link blocks across the levels. Besides pointers, however, links between blocks can be implemented in various well-known manners.

After checking a part of metadata 390 for the requested data at block 505, the method 500 makes the requested data available to the client at block 507. If there is no internal client request for system booting, the startup phase 510 is finished. If there are multiple requests from one or more internal clients for system booting, the requested data per internal client may be available after the corresponding metadata per internal client are checked. Alternatively, the requested data for the multiple internal clients may be available only after the corresponding metadata to the multiple requests are checked.

After the startup phase 510 is finished, during the running 520 and completion phases 530, user data can be accessible to external clients, and the method 500 checks the rest of metadata at block 509.

Figure 6:
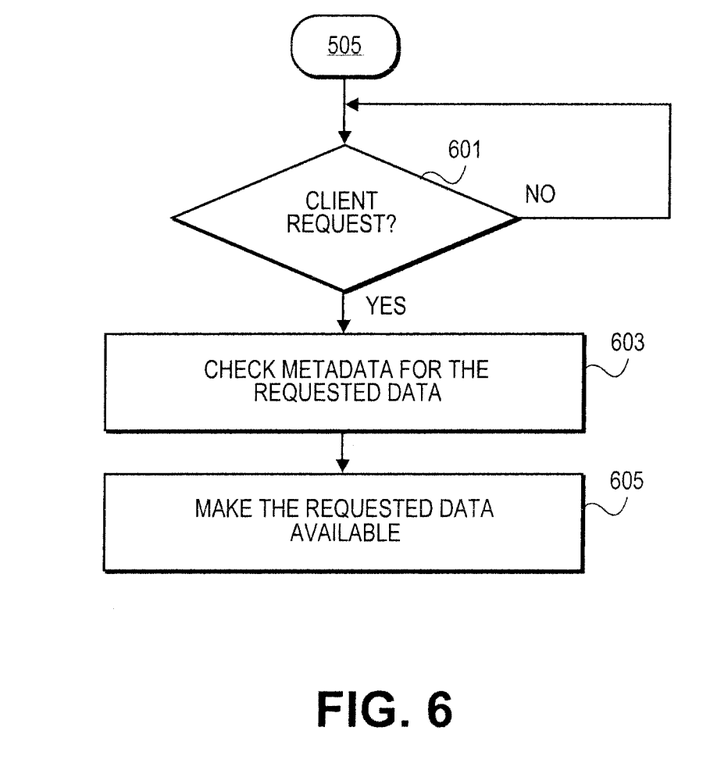
FIG. 6 illustrates a flow diagram of one embodiment of operation 505 in FIG. 5 in accordance with the present invention.

FIG. 6 illustrates a flow diagram of one embodiment of the operation at block 509 shown in FIG. 5. While the method 500 is checking the rest of metadata 390, an external client may request user data. An external client can request a part of a file or an entire file or several files. Part of a file requested by an external client, as well as an entire file and multiple files requested by an external client, may be contained in one or more level-0 blocks in FIG. 4B.

If an external client requests, for example, a user data block 462 shown in FIG. 4B at block 601, the method 500 checks blocks associated with a path that leads to the requested bottom block at block 603. Referring to FIG. 4B, the blocks associated with a path are the hatched blocks above the requested block 462, i.e., level-4 block 410, level-3 block 422, level-2 block 427 and level-1 block 433. Along the identified path, the method 500 checks the root inode in the top block 410 and checks the level-3 block 422, level-2 block 427 and level-1 block 433. When user data are requested, the requested level-0 blocks will not be regarded as associated with a path and will not be checked for file system consistency. Other blocks, for example, the block 426 which are not directly associated with the path leading to the requested block 462 is not checked at this point. At block 605 the method 500 makes the requested data available to the client.

If there are multiple requests from one or more external clients, the requested data per client may be available after the corresponding metadata per external client are checked. Alternatively, the requested data for the multiple external clients may be available only after the corresponding metadata to the multiple requests are checked.

It should be noted that the startup phase 510 as well as running 520 and completion phases 530 can be defined differently from the embodiment in FIGS. 5 & 6. For example, the scope of data to be checked during the startup phase 510 can vary.

In practice, the method 500 may constitute one or more programs made up of computer-executable instructions. Describing the method with reference to the flow diagrams in FIGS. 5 & 6 enables one skilled in the art to develop such programs, including such instructions to carry out the operations (acts) represented by logical blocks 501 through 509 and 601 through 605 on suitably configured computers (the processor of the computer executing the instructions from computer-readable media). The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the method illustrated in FIGS. 5 & 6 without departing from the scope of the invention and that no particular order is implied by the arrangement of blocks shown and described herein.

In one embodiment, the tree of self-consistent blocks on disk that is rooted by the root inode is referred to as a Consistency Point (CP). To implement CPs, the file system 380 of FIG. 3B writes new data to unallocated blocks on disk. Generally, as long as the root inode is not updated, the state of the file system represented on disk does not change. However, for the root inode to refer to newly written data, a new consistency point should eventually be written.

During generating a new CP, all "dirty" inodes (inodes that point to new blocks containing modified data) are re-written to disk. Only when those writes are complete are any writes from other inodes allowed to reach disk. Further, during the time dirty writes are occurring, no new modifications can be made to inodes that have their consistency point flag set. In addition, a global consistency point flag is set so that user-requested changes are not allowed to affect inodes that have their consistency point flag set.

Consequently, a dead-lock can occur with a CP operation and a file system consistency check in accordance with the present invention. During a startup or running or completion phase, the on-demand file system consistency check may be waiting for a CP operation to be complete, and a CP may be waiting for the consistency check to be complete. To resolve this type of dead-lock if any, a priority can be given to one of the two. For example, a special flag for the on-demand file system consistency check can be set to indicate file system consistency check should continue without waiting for a CP operation to finish. A priority can be established as an exclusive or shared one. It should be noted that other solutions can be easily provided by those who skilled in the art. It should be also noted that a CP operation is not related to the core idea of the present invention.

Space accounting for metadata and user data blocks typically is performed during a file system consistency check in accordance with the present invention because once data is open to a user, user data blocks as well as metadata blocks can be changed at any time. Thus, a running count of all the blocks is kept for maintaining consistency. In one embodiment, an efficient block accounting scheme is adopted. When a WAFL (Write Anywhere File Layout) inode is checked for file system consistency for the first time, the on-disk block count value is saved in an on-disk block counter. As the blocks on disk are loaded and checked for file system consistency for the first time, a running count of the total block count is maintained. When the consistency checker 381 completes file system consistency check, the difference, or delta, between the values in the running counter and the on-disk block counter is computed, which represents the actual corruption in the block count values on disk. The delta value is added to the block count in the WAFL inode structure to arrive at the file's accurate block count. It should be also noted that a space accounting is not related to the core idea of the present invention.

According to the present invention, a consistency checker loads and checks a minimal amount of metadata that ensures file system consistency for the requested data, thus reducing the waiting time for a client and can make the requested data available earlier to clients. Experimental data show that the on-demand file system consistency check in accordance with the present invention makes the data available to clients approximately 50-70% faster than an old file system consistency check which checks all the metadata before making the requested data available to clients.

Another advantage is that the cost, e.g., CPU cycle, time and memory space, of file system consistency check will be amortized over the time period to perform and complete a file system consistency check. This helps to have a more predictable and uniform storage server response to clients. Another benefit is that the on-demand file system consistency check reduces the time for a single-threaded startup phase, thus moving the checking of metadata files to the running phase of file system consistency check, making the running phase more parallel to the startup phase.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "computer-readable medium" includes any type of volatile or non-volatile storage device that is accessible by a processor.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for checking file system consistency for a storage server, the method comprising:
receiving a request from a client for data managed by a file system of the storage server during a startup phase of the file system and during a file system consistency checking operation on metadata in the file system, wherein the file system consistency checking operation only checks metadata used to maintain consistency of a metadata file requested by an internal client of the storage server during a startup phase of the file system, wherein the file system consistency checking operation also checks metadata used to maintain consistency of a user data file requested by an external client of the storage server after the startup phase of the file system;
determining that the request is for metadata of a metadata file indicated in the request and is from an internal client, wherein the internal client comprises a process running on the storage server;
while still in the start up phase of the file system, checking consistency of the requested metadata of the metadata file indicated in the request and checking consistency of metadata of the metadata file in a path from a root node for the metadata file to a node for the requested metadata; and
allowing the internal client access to the metadata file during the startup phase after completion of the consistency check of the requested metadata of the metadata file and the consistency check of the metadata in the path, and before metadata of the metadata file outside of the path is checked for consistency.

2. The computer-implemented method of claim 1, wherein the path from the root node to the node for the requested metadata comprises a plurality of levels of a hierarchical data structure that stores the metadata.

3. The computer-implemented method of claim 2, wherein checking consistency comprises:
checking consistency of one or more blocks of metadata associated with the path from a block of a top level to a block of a bottom level, wherein the metadata has a data structure of a plurality of blocks of levels.

4. The computer-implemented method of claim 3, wherein the file system is a write-anywhere file system, and checking consistency comprises:
checking consistency of one or more inode blocks associated with the path identified by pointers of the inode blocks.

5. The computer-implemented method of claim 1, wherein the file system is a write anywhere file system.

6. A system for checking file system consistency for a storage server on a network, the system comprising:
a processor; and
a computer-readable storage medium having program instructions stored therein, the program instructions executable by the processor to cause the system to
receive a request from a client for data managed by a file system of the storage server during a startup phase of the file system and during a file system consistency checking operation on metadata in the file system, wherein the file system consistency checking operation only checks metadata used to maintain consistency of a metadata file requested by an internal client of the storage server during a startup phase of the file system, wherein the file system consistency checking operation also checks metadata used to maintain consistency of a user data file requested by an external client of the storage server after the startup phase of the file system,
determine that the request is for metadata of a metadata file indicated in the request and is from an internal client, wherein the internal client comprises a process running on the storage server;
while still in the startup phase of the file system, check consistency of the requested metadata of the metadata file indicated in the request and checking consistency of metadata of the metadata file in a path from a root node for the metadata file to a node for the requested metadata, and
allow the internal client access to the metadata file during the startup phase after completion of the consistency check of the requested metadata of the metadata file and the consistency check of the metadata in the path, and before metadata of the metadata file outside of the path is checked for consistency.

7. The system of claim 6, wherein the path from the root node to the node for the requested metadata comprises a plurality of levels of a hierarchical data structure that stores the metadata.

8. The system of claim 7, wherein the program instructions executable by the processor to cause the system to check consistency comprises program instructions executable by the processor to cause the systems to check consistency of one or more blocks of metadata associated with the path from a block of a top level to a block of a bottom level, wherein the metadata has a data structure of a plurality of blocks of levels.

9. The system of claim 8, wherein the file system is a write-anywhere file system, and the program instructions executable by the processor to cause the system to check consistency comprises program instructions executable by the processor to cause the system to check consistency of one or more inode blocks of associated with the path identified by pointers of the inode blocks.

10. A non-transitory computer-readable storage medium having stored thereon instructions for checking file system consistency for a storage server on a network, the instructions comprising instructions to:
receive a request from a client for data managed by a file system of the storage server during a startup phase of the file system and during a file system consistency checking operation on metadata in the file system, wherein the file system consistency checking operation only checks metadata used to maintain consistency of a metadata file requested by an internal client of the storage server during a startup phase of the file system, wherein the file system consistency checking operation also checks metadata used to maintain consistency of a user data file requested by an external client of the storage server after the startup phase of the file system;
determine that the request is for metadata of a metadata file indicated in the request and is from an internal client, wherein the internal client comprises a process running on the storage server;
while still in the startup phase of the file system, check consistency of the requested metadata of the metadata file in a path from a root node for the metadata file to a node for the requested metadata; and
allow the internal client access to the metadata file during the startup phase after completion of the consistency check of the requested metadata of the metadata file and the consistency check of the metadata in the path, and before metadata of the metadata file outside of the path is checked for consistency.

11. The computer-readable storage medium of claim 10, wherein
the path from the root node to the node for the requested metadata comprises a plurality of levels of a hierarchical data structure that stores the metadata.

12. The computer-readable storage medium of claim 11, wherein the instructions to check consistency comprises instructions to:
check consistency of one or more blocks of metadata associated with the path from a block of a top level to a block of a bottom level, wherein the metadata has a data structure of a plurality of blocks of levels.

13. The computer-readable storage medium of claim 12, wherein the file system is a write-anywhere file system, and the instructions to check consistency comprise instructions to:
check consistency of one or more inode blocks of associated with the path identified by pointers of the inode blocks.

* * * * *